United States Patent [19]

Lissel et al.

[11] Patent Number: 4,920,345
[45] Date of Patent: Apr. 24, 1990

[54] DEVICE OPERATING ON THE DOPPLER PRINCIPLE TO DETERMINE THE DISTANCE TRAVELED BY A VEHICLE

[75] Inventors: Ernst Lissel; Raimond Holze, both of Wolfsburg, Fed. Rep. of Germany

[73] Assignee: Volkswagen AG, Wolfsburg, Fed. Rep. of Germany

[21] Appl. No.: 261,171

[22] Filed: Oct. 21, 1988

[30] Foreign Application Priority Data

Oct. 30, 1987 [DE] Fed. Rep. of Germany ....... 3736762

[51] Int. Cl.⁵ .................... G01S 13/60; G01S 13/62
[52] U.S. Cl. ................................. 342/70; 342/117
[58] Field of Search ................... 342/70-72, 342/117

[56] References Cited

U.S. PATENT DOCUMENTS

| | | | |
|---|---|---|---|
| 3,859,660 | 1/1975 | Augustine et al. | 342/ |
| 4,012,736 | 3/1977 | Angwin | 342/ |
| 4,065,745 | 12/1977 | Robinson | 342/ |
| 4,414,548 | 11/1983 | Carpenter et al. | 342/ |
| 4,635,059 | 1/1987 | Ball | 342/ |

Primary Examiner—Thomas H. Tarcza
Assistant Examiner—Mark Hellner
Attorney, Agent, or Firm—Brumbaugh, Graves, Donohue & Raymon

[57] ABSTRACT

Contactless measurement of the distance traveled by a vehicle during selected time intervals is provided by a device operating on the Doppler principle. The device has a "phase-locked loop" circuit which generates pulse signals having a frequency proportional to the vehicle velocity. Using the pulses as path length increases, the pulses are added in a counter and the counter output is supplied to an indicating unit to indicate the distance traveled by the vehicle.

3 Claims, 1 Drawing Sheet

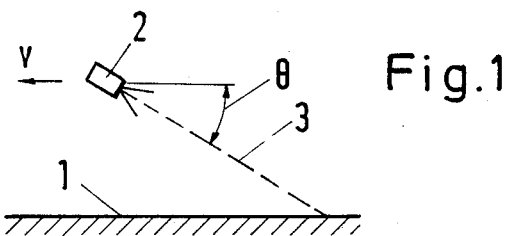
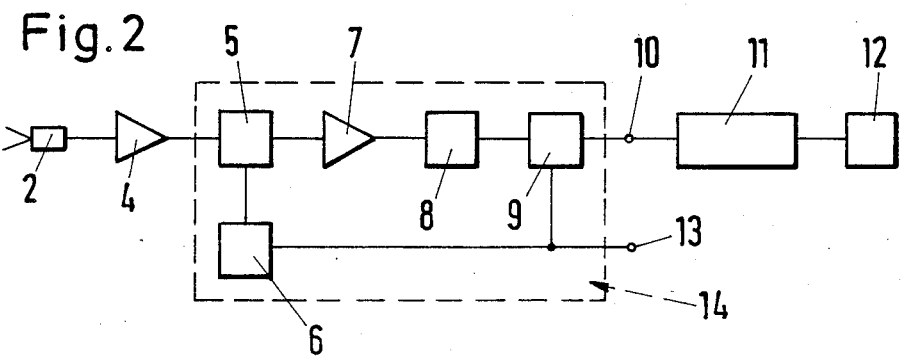
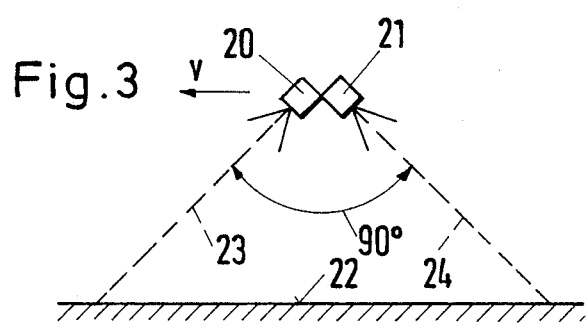
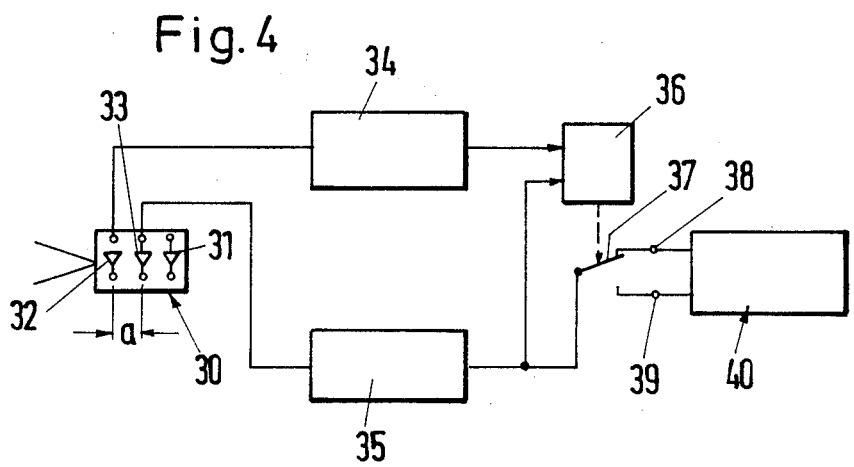

DEVICE OPERATING ON THE DOPPLER PRINCIPLE TO DETERMINE THE DISTANCE TRAVELED BY A VEHICLE

BACKGROUND OF THE INVENTION

This invention relates to vehicle odometers and, more particularly, to a new and improved odometer operating on the Doppler principle.

Conventional vehicle odometers are subject to the disadvantage that their readings depend on various unavoidable influences, for example, wheel slip and variable transmission ratios due to differences in tire sizes and tire pressures. Furthermore, different types of vehicles require odometers of different designs.

The Published European Patent Application No. 0,003,606A2 mentions the possibility of using radar systems operating on the Doppler principle, such as are in conventional use for monitoring speeds in road traffic, for measurement of distance traveled by a vehicle, but it does not describe any particular system. An odometer device utilizing the Doppler principle, because it ascertains the distance traveled directly with respect to the ground, would have the advantage of eliminating the adverse influences mentioned above.

SUMMARY OF THE INVENTION

Accordingly, it is an object of the present invention to provide a new and improved odometer device which overcomes the above-mentioned disadvantages of the prior art.

Another object of the invention is to provide a Doppler radar odometer device which is especially advantageous in terms of precision of indication, reliability and simplicity of construction.

These and other objects of the invention are attained by providing a Doppler principle odometer device including a variable frequency band pass filter having a lower frequency limit determined by the detected Doppler difference signal, along with a comparator responsive to the Doppler radar difference signal to provide a synchronizing signal for a phase-locked loop which provides pulse signals representing the vehicle speed. A counter responds to the pulses from the phase-locked loop to provide an output representing the distance traveled by the vehicle.

Thus, the invention advantageously utilizes the pulse signals delivered by a conventional phase-locked loop to generate a signal representing the distance traveled during a time interval by integrating the pulse signals, which correspond to uniform path increments. Consequently, an odometer arranged according to the invention offers the advantage of delivering a signal not only for the distance traveled but also for the instantaneous speed of travel.

A possible source of error in such a device results from the variation of the differential Doppler frequency with the angle at which the emitted rays intersect the surface, which, in the case of a road vehicle, is the roadway. This error may be averaged out in a simple manner according to the invention by using two antennae in Janus arrangement.

The device according to the invention permits measurement of distance traveled with high precision. If a frequency of 24.125 GHz is used for the emitted rays and if the emission antenna is so arranged that the beam is emitted at an angle of inclination of 45°, a high resolution of 8.8 mm per pulse will result. This rate is entirely sufficient for measuring the distances traveled by vehicles.

The band pass filter, which is controlled by a tuning oscillator so that its lower frequency limit trails the Doppler differential frequency, serves to eliminate low-frequency interference. Here it is important to make certain that the lower frequency limit of the whole signal transmission range, namely, both of the band pass filter and of capacitively-coupled amplifier stages, is as low as possible, so that when the vehicle is operated at very low speeds, such as during starting and stopping, the differential frequency will drop out for only a short time or preferably not at all.

Another advantage of the device according to the invention is that, if suitably circuited, the counter will also indicate the direction of travel at a given time by an algebraic sign, thus subtracting a distance traveled in reverse from the distance traveled in forward gear.

BRIEF DESCRIPTION OF THE DRAWINGS

Further objects and advantages of the invention will be apparent from a reading of the following description in conjunction with the accompanying drawings, in which:

FIG. 1 is a schematic side view illustrating the local relationship between a microwave module and the roadway in a typical Doppler radar odometer arranged according to the invention;

FIG. 2 is a schematic block diagram illustrating the arrangement of a representative embodiment of the present invention;

FIG. 3 is a schematic side view showing a Janus-type antenna system; and

FIG. 4 is a schematic block diagram illustrating another embodiment of the invention which takes into account the direction of vehicle travel.

DESCRIPTION OF PREFERRED EMBODIMENTS

Referring first to the schematic Doppler radar diagram of FIG. 1, a motor vehicle, not shown in detail, is assumed to be moving from right to left as indicated by the arrow at a velocity v over a roadway 1. A microwave module on the vehicle having an antenna 2 directs a radar beam at an angle $\theta$ at the roadway 1, causing a reflected beam to return to the antenna at the same angle $\theta$. A receiver diode in the module 2 generates a differential or Doppler frequency $f_D$ from the emitted and detected radar signals in a conventional manner according to the equation:

$$f_D = \frac{2}{\lambda_0} \cdot v \cdot \cos \theta$$

where $\lambda_0$ is the wavelength of the carrier oscillation, v is the vehicle speed at the time, and $\theta$ is the angle of inclination of the antenna.

The output signal from the microwave module 2 or, in other words, the differential frequency, is processed by a circuit arrangement schematically shown in FIG. 2. In that circuit, the signal from the microwave module 2 is supplied by way of a preamplifier 4 to a variable band pass filter 5 which suppresses low-frequency interference signals. The band pass filter 5 is controlled by a tuning oscillator 6 so that its lower frequency limit is below the instantaneous Doppler frequency and follows changes of said frequency. The output signals from the band pass filter 5 are amplified by an amplifier and supplied to a comparator 8, which follows the differential frequency signals to a conventional "phase-locked loop" (PLL) circuit 9. The PLL circuit is synchronized by the digital signal supplied to it and oscillates about the center of gravity of the frequency spectrum of that signal. Owing to the lag of the PLL circuit, the frequency spectrum, which in itself has the shape of a Gaussian bell curve, is narrowed to one frequency band. In addition, the PLL circuit, in the manner of a flywheel, effects the bridging of systematic pulse dropouts in the signal arriving from the comparator 8.

A digital signal output 10 and an analog signal output 13 are provided from the PLL circuit 9. At the digital output 10 of the PLL circuit, there is a signal having a frequency proportional to the vehicle velocity, and at the analog output 13, there is an analog voltage proportional to that velocity.

The analog voltage is supplied to the tuning oscillator 6 which, as described above, controls the lower frequency limit of the band pass filter 5 to trail the prevailing Doppler frequency.

The digital output 10 of the PLL circuit is connected to the input of a counter 11 which adds up the pulses of the digital output signal of the PLL circuit. Since these pulses represent vehicle distance increments, the signal provided by the counter 11, which is supplied to an indicating unit 12, represents the distance traveled by the vehicle during the counting period. The indicating unit 12 may be a conventional "display" unit. Alternatively, or in addition, the signals supplied to the unit 12 may be used to indicate the need for an oil change or a vehicle inspection.

In order to prevent deviations in the angle $\theta$ of inclination of the radar rays from its preassigned value owing to tolerances or differential vehicle inclinations with respect to the road during operation from affecting the result of the measurement, two microwave modules 20 and 21 may be employed in a Janus arrangement as shown in FIG. 3. In that arrangement, the module 20 emits rays toward the roadway 22 in an oblique forward direction and the module 21 emits rays toward the roadway 22 in an oblique direction to the rear, producing corresponding reflected beams 23 and 24 having an angle of 90° with respect to each other. Any change in vehicle inclination will result in opposite changes in the angles of inclination of the two beams, so that by taking the mean value, the influences thereby exerted on the differential frequencies generated in the modules 20 and 21 can be eliminated.

In the embodiment shown in FIG. 4, the microwave module 30 contains a transmitter diode 31 and two receiver diodes 32 and 33 which are spaced by a distance a equal to one-quarter of the wavelength $\lambda_0$. The receiver diodes 32 and 33 supply signals to corresponding circuits 34 and 35 respectively, each of which has the same arrangement as the circuit within the dashed outline 14 in FIG. 2. The circuits 34 and 35 thus transmit pulse signals which are phase-shifted from each other by 90° to separate inputs of a forward-reverse discriminator 36. Output signals from the discriminator 36 set an electronic switch 37 to connect the output of the circuit 35 to a forward input 38 or a reverse input 39 of a counter 40.

The invention provides a device having a simple, rugged construction for contactless measurement of the distance traveled by a vehicle which may be used at the same time to measure its speed.

Although the invention has been described herein with reference to specific embodiments, many modifications and variations of the invention will readily occur to those skilled in the art. Accordingly, all such variations and modifications are included within the intended scope of the invention.

We claim:

1. Apparatus for indicating the distance traveled by a vehicle comprising microwave signal-generating means including transmitter means and antenna means for emitting rays at a predetermined angle with respect to a surface on which the vehicle is traveling, receiver means for receiving the reflected rays and providing signals representing the differential frequency between the frequencies of emitted and reflected rays, variable band pass filter means having a variable lower frequency limit trailing the differential frequency, comparator means following the variable band pass filter means to generate a synchronizing signal, phase-locked loop circuit means responsive to the synchronizing signal to produce a pulse output signal whose frequency is a function of the vehicle speed and an analog voltage output signal whose voltage is a function of the vehicle speed, counter means responsive to the pulse output signal from the phase-locked loop means to provide signals indicating the distance traveled by the vehicle, and a tuning oscillator to control the lower frequency limit of the variable band pass filter means, one of said pulse and analog voltage signals being supplied to the tuning oscillator to control said lower frequency limit.

2. Apparatus according to claim 1 wherein the antenna means comprises at least two antennae in a Janus arrangement, and including means for determining the mean value of the differential frequencies delivered by the antennae.

3. Apparatus according to claim 1 or claim 2 wherein the receiver means comprises two receiver diodes disposed in offset relation by a quarter wavelength and corresponding circuit means responsive to each of the diode means, including phase-locked loop means provided output pulses which are phase-shifted by 90°, counter means having a forward input and a reverse input, forward-reverse discriminator means, and switch means for directing pulse signals generated by one of the circuit means to the forward or the reverse input of the counter means.

* * * * *